(12) United States Patent
Ishii

(10) Patent No.: US 11,834,894 B2
(45) Date of Patent: Dec. 5, 2023

(54) GLASS PANEL SUPPORT STRUCTURE

(71) Applicant: LIXIL Corporation, Tokyo (JP)

(72) Inventor: Hisashi Ishii, Tokyo (JP)

(73) Assignee: LIXIL Corporation, Tokyo (JP)

( * ) Notice: Subject to any disclaimer, the term of this patent is extended or adjusted under 35 U.S.C. 154(b) by 0 days.

(21) Appl. No.: 17/043,632

(22) PCT Filed: Mar. 18, 2019

(86) PCT No.: PCT/JP2019/011171
§ 371 (c)(1),
(2) Date: Sep. 29, 2020

(87) PCT Pub. No.: WO2019/188497
PCT Pub. Date: Oct. 3, 2019

(65) Prior Publication Data
US 2021/0017804 A1 Jan. 21, 2021

(30) Foreign Application Priority Data
Mar. 30, 2018 (JP) ................................ 2018-069356

(51) Int. Cl.
*E06B 3/54* (2006.01)
*E06B 3/66* (2006.01)
(Continued)

(52) U.S. Cl.
CPC .............. *E06B 3/5427* (2013.01); *E04B 2/88* (2013.01); *E06B 3/66366* (2013.01)

(58) Field of Classification Search
CPC ... E04B 2/88; E04B 2/96; E04B 2/967; E04B 2/885; E06B 3/5427; E06B 3/56; E06B 3/5814; E06B 3/66; E06B 3/66366
See application file for complete search history.

(56) References Cited

U.S. PATENT DOCUMENTS 4,314,424 A * 2/1982 Gordon .................. E06B 3/308
49/495.1
4,947,604 A * 8/1990 Sylvester .................. E06B 3/56
52/204.593
(Continued)

FOREIGN PATENT DOCUMENTS

CN 109518846 A * 3/2019
DE 2326230 A * 12/1974
(Continued)

OTHER PUBLICATIONS

Machine Translate DE2326230; https://translationportal.epo.org/emtp/translate/?ACTION=description-retrieval&COUNTRY=DE&ENGINE=google&FORMAT=docdb&KIND=A1&LOCALE=en_EP&NUMBER=2326230&SRCLANG=de&TRGLANG=en (Year: 2021).*

*Primary Examiner* — Ryan D Kwiecinski
(74) *Attorney, Agent, or Firm* — MORRISON & FOERSTER LLP

(57) ABSTRACT

A glass panel support structure supports multi-glazed glass of which a circumferential edge part is bonded to a frame that frames all sides. The glass panel support structure includes a first structural sealant that bonds an indoor-side glass plate of the multi-glazed glass and the frame over an entire circumference, and a spacer provided between glass plates of the multi-glazed glass over the entire circumference. Along a first direction perpendicular to an indoor and outdoor direction of the multi-glazed glass, a position of an inner circumferential surface of the spacer is identical with a position of an inner circumferential surface of the first structural sealant or is located on outer circumferential side with respect to position of the inner circumferential surface of the first structural sealant.

5 Claims, 4 Drawing Sheets

(51) Int. Cl.
*E04B 2/88* (2006.01)
*E06B 3/663* (2006.01)

(56) References Cited

U.S. PATENT DOCUMENTS

| | | | | |
|---|---|---|---|---|
| 4,998,392 | A * | 3/1991 | Massarelli | E06B 3/5427 |
| | | | | 428/34 |
| 5,076,034 | A * | 12/1991 | Bandy | E06B 3/5427 |
| | | | | 52/468 |
| 7,676,999 | B2 * | 3/2010 | Arias | E06B 3/5427 |
| | | | | 52/762 |
| 9,574,831 | B2 * | 2/2017 | Benes | E06B 3/26 |
| 9,663,946 | B2 * | 5/2017 | Frederick | E04B 2/96 |
| 9,752,319 | B1 * | 9/2017 | LeVan | E04B 2/965 |
| 2009/0077921 | A1 | 3/2009 | Carbary et al. | |
| 2014/0026502 | A1 | 1/2014 | Carbary et al. | |
| 2017/0145733 | A1 * | 5/2017 | Benes | F28F 9/007 |
| 2017/0254074 | A1 | 9/2017 | Levan | |
| 2019/0194939 | A1 * | 6/2019 | Frederick | E04B 2/967 |
| 2021/0054680 | A1 * | 2/2021 | Benes | E06B 3/56 |

FOREIGN PATENT DOCUMENTS

| | | | | |
|---|---|---|---|---|
| GB | 2190696 | A * | 11/1987 | |
| JP | 2003-509324 | A | 3/2003 | |
| JP | 2009-503292 | A | 1/2009 | |
| JP | 5160420 | B2 | 3/2013 | |
| JP | 2014-503725 | A | 2/2014 | |
| JP | 5916760 | B2 | 5/2016 | |
| JP | 2017-179987 | A | 10/2017 | |
| KR | 2001-0015933 | A | 3/2001 | |
| KR | 20140123234 | A * | 10/2014 | |
| KR | 2015146298 | A * | 12/2015 | |
| KR | 1697740 | B1 * | 1/2017 | |
| KR | 1763160 | B1 * | 8/2017 | ............ E04B 2/885 |
| KR | 1908415 | B1 * | 10/2018 | |
| KR | 2018113036 | A * | 10/2018 | ............ E04B 2/967 |
| KR | 2025651 | B1 * | 9/2019 | ............ E04B 1/78 |
| NL | 8703061 | A * | 7/1989 | |
| WO | 01/20116 | A1 | 3/2001 | |

\* cited by examiner

GLASS PANEL SUPPORT STRUCTURE

CROSS-REFERENCE TO RELATED APPLICATIONS

This application is a national stage application under 35 USC 371 of International Application No. PCT/JP2019/011171, filed Mar. 18, 2019, which claims the priority of Japanese Application No. 2018-069356, filed Mar. 30, 2018, the entire contents of each of which are incorporated herein by reference.

FIELD OF THE DISCLOSURE

The present disclosure relates to a glass panel support structure.

BACKGROUND OF THE DISCLOSURE

As a construction system for supporting glass panels that constitute wall surfaces of a building, a structural silicone glazing (SSG) system, as described in Japanese Unexamined Patent Application Publication No. 2017-179987, has been conventionally known. In SSG systems, glass panels are bonded to support members constituted by aluminum frames using first structural sealants, thereby supporting the glass panels. The SSG systems are marked by glass panels fitted into aluminum frames, which enable transmission of loads of the glass panels to the aluminum frames, and also by flatter and smoother surfaces on the outdoor side compared to conventional curtain walls for supporting glass panels.

When multi-glazed glass panels are employed in such an SSG system, second structural sealants are disposed between the sheets of glass.

SUMMARY OF THE DISCLOSURE

In a conventional SSG system employing multi-glazed glass panels, the load ratio in a structural sealant portion at negative pressure is determined based on the ratio between a first width dimension of the first structural sealant that connects the multi-glazed glass and the support member, and a second width dimension between the sheets of glass of the multi-glazed glass panel. In a conventional SSG system, the first width dimension and the second width dimension are generally set to the same dimension. Accordingly, a third width dimension of an entire portion including the second structural sealant and desiccant provided between the sheets of multi-glazed glass is conventionally larger than the first width dimension.

On the first structural sealant, a backup material is disposed at a position closer to the center along a direction perpendicular to the indoor and outdoor directions of the glass, and the backup material bears negative pressure loads and positive pressure loads applied to the glass. The first structural sealant could peel off because of deterioration of the boundary surface between the first structural sealant and the backup material, and deterioration of the first structural sealant could be promoted because of moisture entering through the boundary surface. Also, because of bubbles entering the bonded surface between the multi-glazed glass and the first structural sealant provided on the indoor side of the multi-glazed glass, the bonded surface could be reduced, and the bearing force of the first structural sealant could also be reduced.

There is a need or demand for a glass panel support structure in which the bonding state of a structural sealant provided between a glass panel and a frame can be visually checked.

A glass panel support structure according to the present disclosure supports multi-glazed glass of which a circumferential edge part is bonded to a frame that frames all sides. The glass panel support structure includes a first structural sealant that bonds an indoor-side glass plate of the multi-glazed glass and the frame over an entire circumference, and a spacer provided between glass plates of the multi-glazed glass over the entire circumference. Along a first direction perpendicular to an indoor and outdoor direction of the multi-glazed glass, a position of an inner circumferential surface of the spacer is identical with a position of an inner circumferential surface of the first structural sealant or is located on the outer circumferential side with respect to the position of the inner circumferential surface of the first structural sealant.

With the glass panel support structure according to some embodiments, the position of the inner circumferential surface of the spacer provided in the multi-glazed glass is identical with or located on the outer circumferential side with respect to the position of the inner circumferential surface of the first structural sealant provided between the multi-glazed glass and the frame. Accordingly, the bonding state of the structural sealant can be visually checked from the outdoors through the multi-glazed glass. For example, bubbles entering between the indoor-side glass plate of the multi-glazed glass and the structural sealant can be found. Therefore, with the glass panel support structure, a void or peeling off of the structural sealant can be easily found, and the structural sealant can be replaced or repaired accordingly. This can prevent the coming off of the multi-glazed glass from the frame.

In some embodiments of the glass panel support structure, the inner circumferential surface of the spacer may be located on the outer circumferential side with respect to the inner circumferential surface of the first structural sealant.

In this case, the inner circumferential surface of the spacer provided in the multi-glazed glass is located on the outer circumferential side with respect to the inner circumferential surface of the first structural sealant provided between the multi-glazed glass and the frame. Accordingly, the bonding state of the structural sealant can be visually checked more easily from the outdoors through the multi-glazed glass.

In some embodiments of the glass panel support structure, on the inner circumferential surface of the first structural sealant, a backup material may be provided. Also, along the first direction, the inner circumferential surface of the spacer may be located on the outer circumferential side with respect to a boundary surface between the first structural sealant and the backup material.

In this case, peeling off of the bonded surface of the structural sealant bonded to the multi-glazed glass or a discoloration state of the structural sealant can be visually checked from the outdoors through the multi-glazed glass.

In some embodiments of the glass panel support structure, the first structural sealant may preferably be filled from an outer circumferential edge of the multi-glazed glass to an outer circumferential edge of the backup material along the first direction.

In the glass panel support structure thus configured, the outer circumferential edge of the first structural sealant will never be positioned on the inner circumferential side with respect to the inner circumferential surface of the spacer along the first direction. Accordingly, the frame can be made smaller, and the glass opening of the multi-glazed glass can be made larger.

Also, with the glass panel support structure, the first structural sealant is filled to the position of the outer circumferential edge of the backup material along the first direction. In this state, a moment will not be generated, so that a load from the multi-glazed glass equally acts on the first structural sealant with balance.

In some embodiments of the glass panel support structure, the first structural sealant and the backup material may be provided over the entire circumference of the circumferential edge part of the multi-glazed glass.

In this case, a load from the multi-glazed glass equally acts on the first structural sealant with balance over the entire circumference of the multi-glazed glass, thereby restraining worsening of the bonding state and deterioration in durability of the first structural sealant.

In some embodiments of the glass panel support structure, the first structural sealant may be spaced apart from a glass support surface, which supports the circumferential edge part of the multi-glazed glass, of the frame in the first direction.

In this case, a space is formed between the glass support surface of the frame and the outer circumferential surface of the first structural sealant, preventing the bonding between the first structural sealant and the glass support surface of the frame. Accordingly, the glass panel support structure prevents the situation where such bonding between the first structural sealant and the glass support surface of the frame complexes a stress acting on the first structural sealant.

In some embodiments of the glass panel support structure, a side surface of the multi-glazed glass on the indoor side may be supported by the frame via the first structural sealant, and a space may be formed between the outer circumferential edge of the multi-glazed glass and the frame.

In this case, since a space is formed between the outer circumferential edge of the multi-glazed glass and the frame along a first direction, the first structural sealant can be easily viewed from the outdoor side through the multi-glazed glass. Accordingly, the visual check of the bonding state of the first structural sealant as described previously can be easily performed.

In some embodiments of the glass panel support structure, the spacer may include a spacer member and a second structural sealant having a water stop function, and the first structural sealant and the second structural sealant may be arranged to overlap each other in the first direction.

In this case, the loads applied to the first structural sealant and the second structural sealant will be equal.

With the glass panel support structure according to the present disclosure, the bonding state of a structural sealant provided between a glass panel and a frame can be visually checked.

BRIEF DESCRIPTION OF THE FIGURES

Some embodiments will now be described, by way of example only, with reference to the accompanying drawings which are meant to be exemplary, not limiting, and wherein like elements are numbered alike in several Figures, in which.

DETAILED DESCRIPTION OF THE DISCLOSURE

In the following, an example of the glass panel support structure according to some embodiments of the present disclosure will be described with reference to the drawings.

Figure 1:
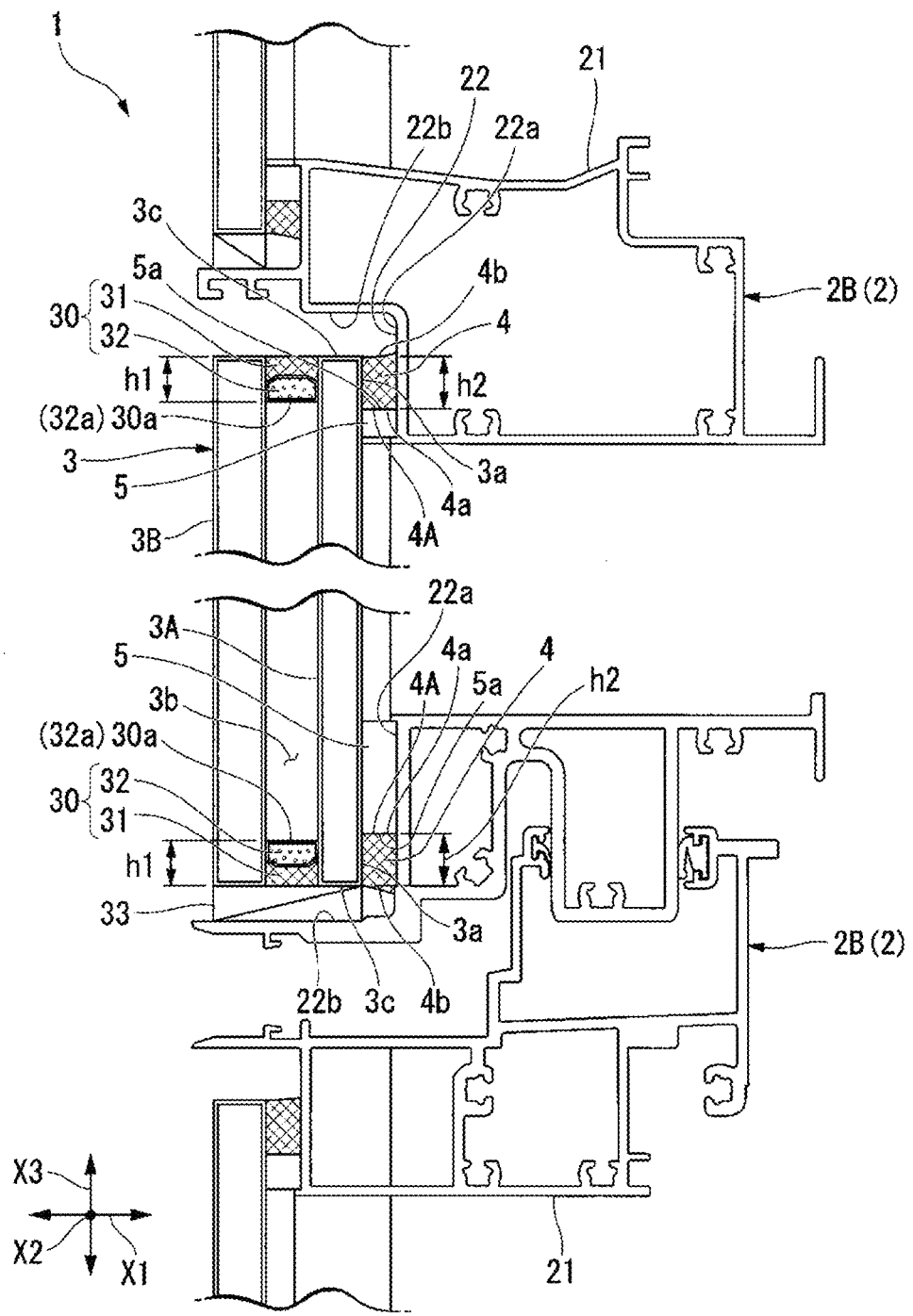
FIG. 1 is a vertical sectional view of a curtain wall illustrating a configuration in which a glass panel support structure is employed for multi-glazed glass of the curtain wall according to some embodiments.
Figure 2:
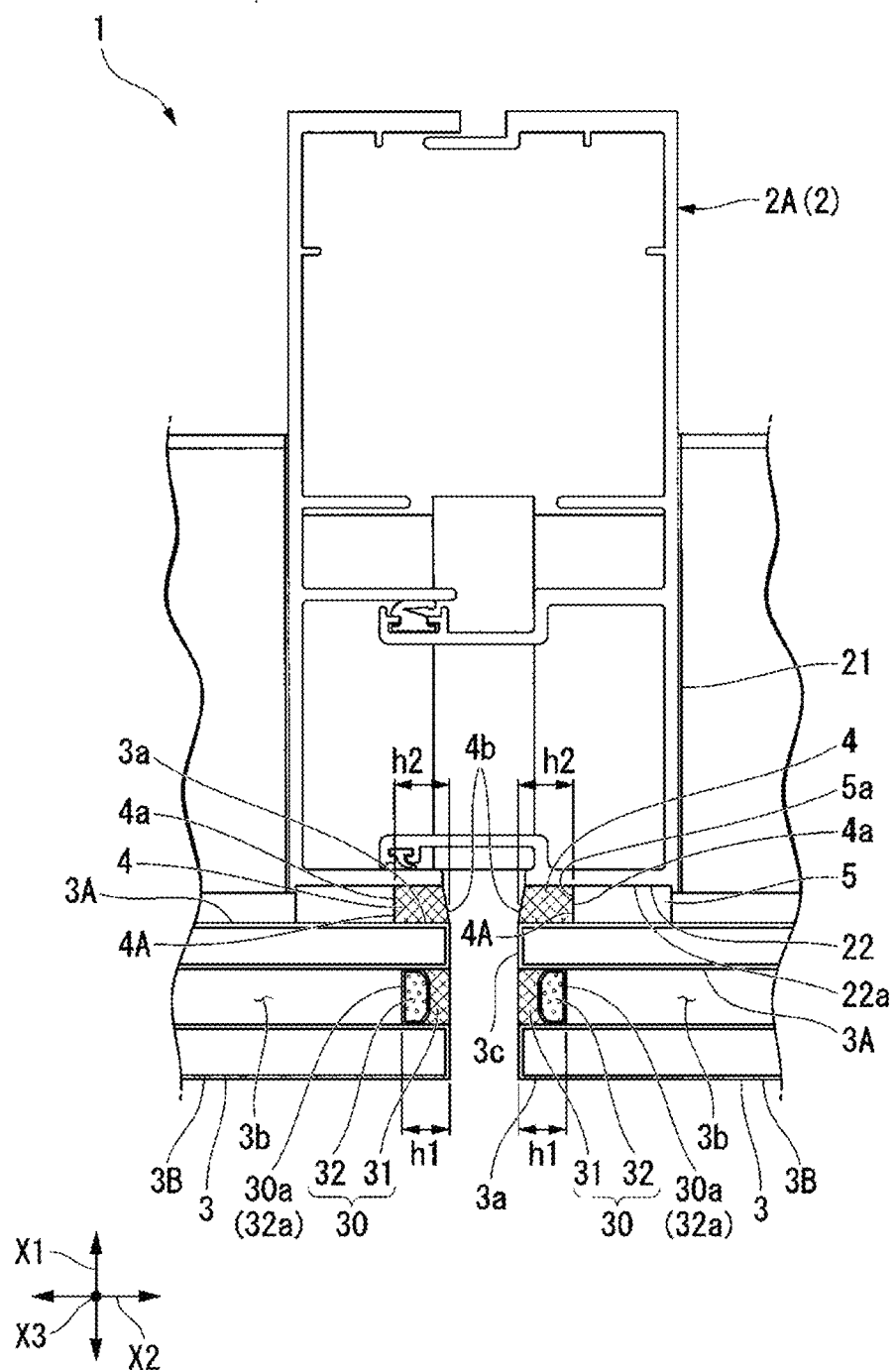
FIG. 2 is a horizontal sectional view of the configuration of the support structure for the multi-glazed glass shown in FIG. 1 according to some embodiments.

FIGS. 1 and 2 illustrate an example in which the glass panel support structure of some embodiments is employed in an SSG system in a curtain wall 1 of a building. The glass panel support structure supports multi-glazed glass 3 of which a circumferential edge part 3a is bonded to a frame 2 that frames all sides.

The curtain wall 1 includes the frame 2 and the multi-glazed glass 3. The frame 2 is configured to frame all sides with multiple vertical frames 2A and lateral frames 2B such as to form a lattice. The multi-glazed glass 3 is fitted in the opening part of the frame 2.

In an SSG system, the multi-glazed glass 3 and the frame 2 are bonded to each other using a structural sealant (a first structural sealant 4, which will be described later) such that the frame 2 supports a load on the multi-glazed glass 3. In such an SSG system, a support part for supporting the multi-glazed glass 3 is not provided on the side surface of the multi-glazed glass 3 on the outdoor side.

In the following description, a direction connecting the outdoor side and the indoor side will be referred to as an indoor and outdoor direction X1. Also, when viewed from a direction in which an opening part of the building penetrates through a framework, a horizontal direction connecting the left side and the right side will be referred to as a lateral direction X2. With regard to each member or component constituting the curtain wall 1, the state of the member or component provided in the opening part will be described using the indoor and outdoor directions X1 and the lateral directions X2. Also, within a plane including both the lateral directions X2 and vertical directions X3 of the opening part, a direction perpendicular to the indoor and outdoor directions X1 is defined as a first direction. Along a first direction, the side closer to the center of the multi-glazed glass 3 will be referred to as the inner circumferential side, and the side closer to the frame 2 will be referred to as the outer circumferential side.

Each vertical frame 2A is provided along a vertical direction X3 of the building. Each vertical frame 2A is fixed to a building framework, such as a pillar, beam, and floor, using an angle member or the like, which is not illustrated.

Each lateral frame 2B is laid along a lateral direction X2 between neighboring vertical frames 2A and fixed to the vertical frames 2A.

The frame 2 includes a frame body 21, and a glass attachment part 22 disposed on the outdoor side of the frame body 21. Each of the frame body 21 and the glass attachment part 22 may be made of a metal material, such as aluminum, and may be formed by extrusion molding of the metal material, for example. The frame body 21 is configured to be attachable to a building framework.

To the glass attachment part 22, the multi-glazed glass 3 is attached, as described previously. The glass attachment part 22 includes an outer side support surface 22a facing the outdoor side, and a glass support surface 22b facing an outer circumferential edge 3c of the multi-glazed glass 3. An indoor side portion of the circumferential edge part 3a of the multi-glazed glass 3 is bonded to and held by the outer side support surface 22a via the first structural sealant 4.

Between the outer circumferential edge 3c of the multi-glazed glass 3 and the glass support surface 22b of the frame 2, a space is provided. The outer circumferential edge 3c of the multi-glazed glass 3 is formed by edge surfaces of glass plates 3A and 3B and an edge surface of a second structural sealant 31.

The glass support surface 22b is positioned lower than the multi-glazed glass 3 and supports the multi-glazed glass 3 with the outer circumferential edge 3c placed on the glass support surface 22b via a setting block 33. Multiple setting blocks 33 are spaced out along a lateral direction X2 of the multi-glazed glass 3. The glass support surface 22b may be formed only in a portion provided with the setting blocks 33. In some embodiments, between the glass support surface 22b on which the setting blocks 33 are not provided and the multi-glazed glass 3, a widening space is formed such that the distance from the outer circumferential edge 3c of the multi-glazed glass 3 across the space becomes larger from the indoor side toward the outdoor side, as illustrated in FIG. 1.

The first structural sealant 4 bonds each of the four edge parts of the indoor-side glass plate 3A of the multi-glazed glass 3 and the outer side support surface 22a of the frame 2 together. The first structural sealant 4 is filled from the position of the outer circumferential edge 3c of the multi-glazed glass 3 to an outer circumferential edge 5a of a backup material 5, which will be described later, in a first direction. The first structural sealant 4 is spaced apart from the glass support surface 22b of the frame 2.

On the inner circumferential side of the first structural sealant 4, the backup material 5 is provided. The backup material 5 is in close contact with the indoor-side glass plate 3A of the multi-glazed glass 3 and the outer side support surface 22a of the frame 2 and is held therebetween. The backup material 5 may be made of an elastic body, such as expandable polyethylene foam, for example.

The configurations of the first structural sealant 4 and the backup material 5 are the same over the entire circumference of the circumferential edge part 3a of the multi-glazed glass 3.

The multi-glazed glass 3 is disposed at a position such that the circumferential edge part 3a thereof faces the outer side support surface 22a of the glass attachment part 22. The multi-glazed glass 3 has a configuration in which a space 3b is provided between the two glass plates 3A and 3B that are arranged to face each other and to be spaced apart from each other, and dry air is sealed in the space 3b. In the multi-glazed glass 3, a spacer 30 is provided to maintain a constant distance between the glass plates 3A and 3B. The spacer 30 includes the second structural sealant 31 and a spacer member 32. The second structural sealant 31 is provided on the outer circumferential side of the spacer member 32 to bond the glass plates 3A and 3B together, and has a water stop function. The spacer member 32 is provided on the inner circumferential side of the second structural sealant 31.

The spacer member 32 may be constituted by desiccant to prevent dew condensation within the space 3b of the multi-glazed glass 3, or may also be constituted by a metal material or a resin material.

An inner circumferential surface 30a of the spacer 30 (or an inner circumferential surface 32a of the spacer member 32) is positioned on the outer circumferential side with respect to an inner circumferential surface 4a of the first structural sealant 4 (or a boundary surface 4A between the first structural sealant 4 and the backup material 5). In other words, a height dimension h1 of the spacer 30 in a first direction is smaller than a height dimension h2 of the first structural sealant 4 (h1<h2).

In the spacer 30 (and also in the first structural sealant 4 and the backup material 5), the side closer to the center of the multi-glazed glass 3 along a first direction is defined as the inner circumferential side, and the side closer to the end part (the outer circumferential edge 3c) of the multi-glazed glass 3 is defined as the outer circumferential side.

The height dimension h2 of the first structural sealant 4 and the height dimension h1 of the second structural sealant 31 described above are determined as follows.

When the indoor pressure is higher than the outdoor pressure, or when external pressure related to outside wind speed acts on an outer wall surface and another outer wall surface perpendicular to the outer wall surface peels off, a negative pressure wind load is applied to the multi-glazed glass 3. Because of such a negative pressure wind load or the like, a tensile load is applied to the first structural sealant 4. Accordingly, it needs to be confirmed that air (a void) or the like is not present in the bonding interface between the first structural sealant 4 and the multi-glazed glass 3 at the time of manufacture. Also, after the construction, the curtain wall will be operated for a long period of time, so that peeling off may occur because of various influence factors. Therefore, as described in some embodiments, it is effective to reduce the height dimension of the second structural sealant 31 (spacer 30) depending on the ratio of applied load between the glass plates 3A and 3B of the multi-glazed glass 3.

More specifically, when the thickness dimension of each of the glass plates 3A and 3B is identical in the multi-glazed glass 3, the glass plates 3A and 3B respectively bear substantially halves (such as 53:47) of a wind load or the like. The first structural sealant 4 supports a load on the multi-glazed glass 3 from the indoor side, and the height of the first structural sealant 4 is determined based on a wind load, irrespective of glass thickness. Meanwhile, even if the height of the second structural sealant 31 between the glass plates 3A and 3B is reduced, the wind pressure resistance of the glass panel support structure can be ensured. Therefore, the height of the second structural sealant 31 is determined depending on the thickness ratio between the glass plates 3A and 3B arranged along an indoor and outdoor direction X1.

In the following, functions of the glass panel support structure of some embodiments will be described with reference to the drawings.

As illustrated in FIGS. 1 and 2, in some embodiments, the inner circumferential surface 30a of the spacer 30 provided in the multi-glazed glass 3 is positioned on the outer circumferential side along a first direction, with respect to the inner circumferential surface 4a of the first structural sealant 4 provided between the multi-glazed glass 3 and the frame 2. In other words, the inner circumferential surface 4a of the first structural sealant 4 is positioned on the inner side with respect to the inner circumferential surface 30a of the spacer 30, so that the bonding state of the first structural sealant 4 can be visually checked from the outdoors through the multi-glazed glass 3. For example, bubbles entering between the indoor-side glass plate 3A of the multi-glazed glass 3 and the first structural sealant 4 can be found.

Therefore, in some embodiments, a void or peeling off of the first structural sealant 4 can be easily found, and the first structural sealant 4 can be replaced or repaired accordingly. This can prevent the coming off of the multi-glazed glass 3 from the frame 2.

Also, in some embodiments, the inner circumferential surface 30a of the spacer 30 is positioned on the outer circumferential side with respect to the boundary surface 4A between the first structural sealant 4 and the backup material 5. Accordingly, peeling off of the bonded surface of the first structural sealant 4 bonded to the multi-glazed glass 3 or a discoloration state of the first structural sealant 4 can be visually checked from the outdoors through the multi-glazed glass 3. For example, if a plasticizer or the like leaks out of the backup material 5 toward the first structural sealant 4, the bonded surface of the first structural sealant 4 bonded to the multi-glazed glass 3 can be checked.

Also, in some embodiments, since the outer circumferential edge of the second structural sealant 31 in the multi-glazed glass 3 and the outer circumferential edge of the first structural sealant 4 are provided at the same position, a load can be smoothly transmitted through a smaller area. In other words, a moment is generated when the positions of the outer circumferential edges of the second structural sealant 31 and the first structural sealant 4 are shifted from each other, but such a moment is less likely to act in the case of some embodiments.

Also, in some embodiments, the first structural sealant 4 is provided on the outdoor side with respect to the backup material 5. When a step is formed between the inner circumferential edge of the glass and the first structural sealant 4 on the frame 2 side, rain water may enter and stand in the first structural sealant 4. In this case, the temperature of the rain water may be raised by sunlight, making the rain water warm. This may cause peeling off of the bonding interface of the first structural sealant 4 with the circumferential edge part 3a or peeling off of the outer side support surface 22a side of the first structural sealant 4. Accordingly, disposing the first structural sealant 4 on the outdoor side with respect to the backup material 5, as described in some embodiments, can prevent the problem of deterioration of the bonding interface or the outer side of the first structural sealant 4.

In some embodiments, the first structural sealant 4 is filled from the outer circumferential edge 3c of the multi-glazed glass 3 to the outer circumferential edge 5a of the backup material 5 in a first direction, as illustrated in FIG. 1. Accordingly, an outer circumferential surface 4b of the first structural sealant 4 will never be positioned on the inner circumferential side with respect to the inner circumferential surface 30a of the spacer 30. As a result, the frame 2 can be made smaller, and the glass opening of the multi-glazed glass 3 can be made larger.

Also, in some embodiments, the first structural sealant 4 is filled to the position of the outer circumferential edge 5a of the backup material 5 in a first direction. In this state, a moment will not be generated, so that a load from the multi-glazed glass 3 equally acts on the first structural sealant 4 with balance.

In some embodiments, the configurations of the first structural sealant 4 and the backup material 5 are the same over the entire circumference of the circumferential edge part 3a of the multi-glazed glass 3. Accordingly, a load from the multi-glazed glass 3 equally acts on the first structural sealant 4 with balance over the entire circumference of the multi-glazed glass 3, thereby restraining worsening of the bonding state and deterioration in durability of the first structural sealant 4.

In some embodiments, a space is formed between the glass support surface 22b of the frame 2 and the outer circumferential surface 4b of the first structural sealant 4, preventing the bonding between the first structural sealant 4 and the glass support surface 22b. Accordingly, some embodiments prevent the situation where such bonding between the first structural sealant 4 and the glass support surface 22b complexes a stress acting on the first structural sealant 4.

More specifically, if the first structural sealant 4 is bonded to the glass support surface 22b, the first structural sealant 4 will receive the stress from the glass support surface 22b, in addition to the stress from the frame side surface (or the outer side support surface 22a of the frame 2). Receiving such stresses from various directions may cause fracture or damage of the first structural sealant 4, which is disadvantageous. Accordingly, the configuration in which the first structural sealant 4 is not bonded to the glass support surface 22b with a space formed therebetween, as described above, can minimize the contact between the frame 2 and the first structural sealant 4.

In some embodiments, since a space is formed between the outer circumferential edge 3c of the multi-glazed glass 3 and the frame 2 along a first direction, the first structural sealant 4 can be easily viewed from the outdoor side through the multi-glazed glass 3. Accordingly, the visual check of the bonding state of the first structural sealant 4 as described previously can be easily performed. The multi-glazed glass 3 is supported by the frame 2 via the first structural sealant 4, and the side surface of the glass plate 3B on the outdoor side is not directly supported by the frame 2. Accordingly, a space is formed between the glass attachment part 22 and the side surface of the glass plate 3B on the outdoor side. As a result, the bonding state of the first structural sealant 4 can be visually checked easily from the outdoor side.

Thus, with the glass panel support structure of some embodiments, the bonding state of the first structural sealant 4 provided between the multi-glazed glass 3 and the frame 2 can be visually checked.

Embodiments of the glass panel support structure of the present disclosure have been described. The present disclosure is not limited to the aforementioned embodiment, and modifications may be appropriately made without departing from the spirit of the present disclosure.

For example, in some embodiments, the multi-glazed glass 3 is constituted by the two glass plates 3A and 3B. However, the number of glass plates is not limited to two, and three or more glass plates may be arranged to face one another in the multi-glazed glass.

Also, in the example of some embodiments described above, the position in a height direction of the inner circumferential surface 30a of the spacer 30 (or the inner circumferential surface 32a of the spacer member 32) is lower than the position of the inner circumferential surface 4a of the first structural sealant 4. However, the positional relationship may be as illustrated in FIGS. 3 and 4 as a modification.

Figure 3:
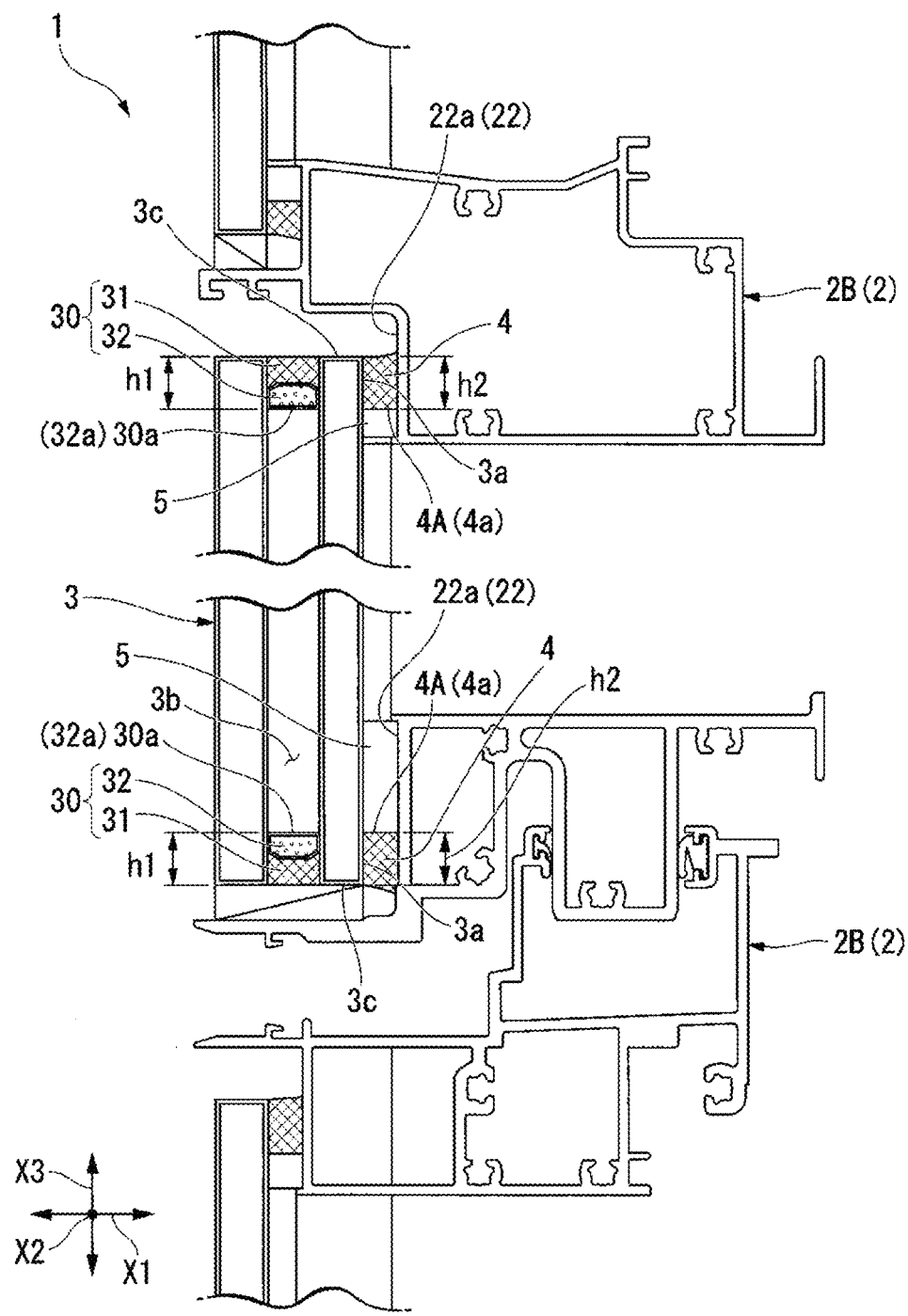
FIG. 3 is a vertical sectional view of a curtain wall illustrating a configuration of a support structure for multi-glazed glass according to some embodiments.
Figure 4:
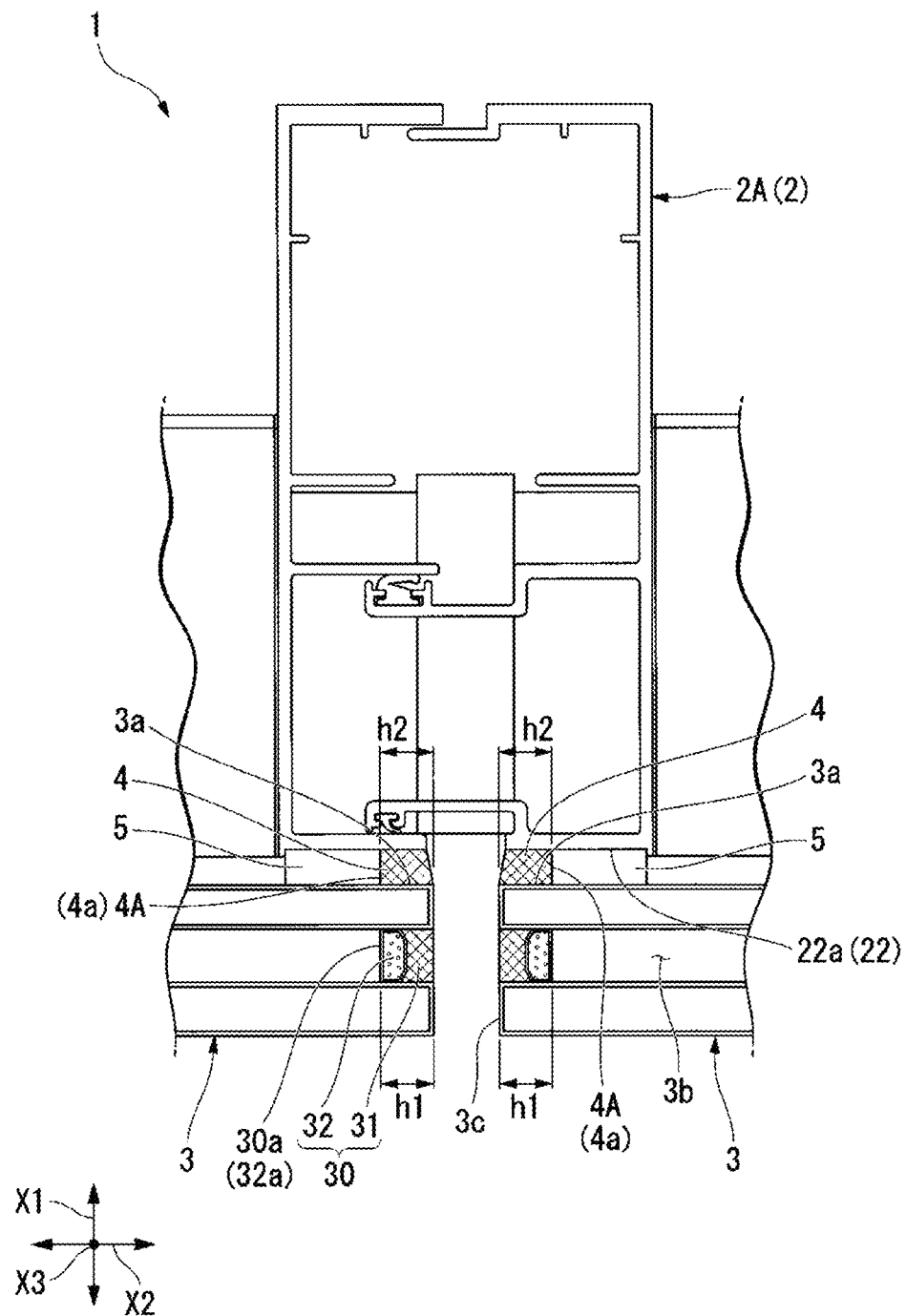
FIG. 4 is a horizontal sectional view of the configuration of the support structure for the multi-glazed glass shown in FIG. 1 according to some embodiments.

More specifically, as illustrated in FIGS. 3 and 4, the height of the inner circumferential surface 30a of the spacer 30 may be identical with the height of the inner circumferential surface 4a of the first structural sealant 4 (h1=h2). In short, the position in a height direction of the inner circumferential surface 30a of the spacer 30 has only to be identical with or located on the outer circumferential side with respect to the position in a first direction of the inner circumferential surface 4a of the first structural sealant 4.

Also, in the glass panel support structure, the spacer 30 of the multi-glazed glass 3 includes the spacer member and the second structural sealant 31 having a water stop function, and the first structural sealant 4 and the second structural sealant 31 may be arranged such as to overlap each other in an indoor and outdoor direction X1. In this case, the loads applied to the first structural sealant 4 and the second structural sealant 31 will be equal.

Also, in the frame 2, the frame body 21 and the glass attachment part 22 may be constituted by different members, and a seismic isolation mechanism may be provided therebetween, for example.

Further, the constituting elements in the abovementioned embodiments may be appropriately replaced with well-known constituting elements, without departing from the spirit of the present disclosure.

With the glass panel support structure of the present disclosure, the bonding state of a structural sealant provided between a glass panel and a frame can be visually checked.

The invention claimed is:

1. A glass panel support structure that supports multi-glazed glass of which a circumferential edge part is bonded to a frame that frames all sides, the glass panel support structure comprising:
    a first structural sealant that bonds an indoor-side glass plate of the multi-glazed glass and the frame over an entire circumference, forming a space between the frame and an outer edge of the first structural sealant, wherein the multi-glazed glass is supported on a first side by the first structural sealant and a second side of the multi-glazed glass, opposite the first side, is not in contact with a sealant; and
    a spacer provided between glass plates of the multi-glazed glass over the entire circumference, wherein
    along a first direction perpendicular to an indoor and outdoor direction of the multi-glazed glass, a position of an inner circumferential surface of the spacer is located on outer circumferential side with respect to position of the inner circumferential surface of the first structural sealant, and the glass plates of the multi-glazed glass are attached to a glass support surface of a glass attachment part of the frame such that one or more setting blocks provided not over an entire circumference of the glass support surface are positioned between an outer circumferential edge of the multi-glazed glass and the glass support surface of the glass attachment part,
    the space is formed by the glass support surface, an indoor side of the setting block, and the outer edge of the first structural sealant,
    on the inner circumferential surface of the first structural sealant, a backup material is provided, and along the first direction, the inner circumferential surface of the spacer is located on outer circumferential side with respect to a boundary surface between the first structural sealant and the backup material, and
    the first structural sealant extends from an outer circumferential edge of the multi-glazed glass to an outer circumferential edge of the backup material along the first direction.

2. The glass panel support structure of claim 1, wherein the first structural sealant and the backup material are provided over entire circumference of circumferential edge part of the multi-glazed glass.

3. The glass panel support structure of claim 1, wherein the first structural sealant is spaced apart from a glass support surface of the frame in the first direction, and the glass support surface supports circumferential edge part of the multi-glazed glass.

4. The glass panel support structure of claim 1, wherein a side surface of the multi-glazed glass on the indoor side is supported by the frame via the first structural sealant, and a space is formed between outer circumferential edge of the multi-glazed glass and the frame.

5. The glass panel support structure of claim 1, wherein the spacer comprises a spacer member and a second structural sealant having a water stop function, and the first structural sealant and the second structural sealant are arranged to overlap each other in the first direction.

* * * * *